US012754957B1

(12) United States Patent
Chopra et al.

(10) Patent No.: US 12,754,957 B1
(45) Date of Patent: Oct. 6, 2026

(54) SYSTEMS AND METHODS FOR GENERATING PROMPTS FOR MACHINE LEARNING MODELS BASED ON USER-SELECTED SOURCE DOCUMENT INFORMATION

(71) Applicant: Instabase, Inc., Dover, DE (US)

(72) Inventors: Vishnu Chopra, London (GB); Zhenya Gu, New York, NY (US)

(73) Assignee: Instabase, Inc., Dover, DE (US)

( * ) Notice: Subject to any disclaimer, the term of this patent is extended or adjusted under 35 U.S.C. 154(b) by 0 days.

(21) Appl. No.: 19/012,578

(22) Filed: Jan. 7, 2025

(51) Int. Cl.
*G06F 16/9032* (2019.01)
*G06F 16/93* (2019.01)

(52) U.S. Cl.
CPC ........ *G06F 16/90328* (2019.01); *G06F 16/93* (2019.01)

(58) Field of Classification Search
CPC ........................... G06F 16/90328; G06F 16/93
USPC ........................................................ 707/767
See application file for complete search history.

(56) References Cited

U.S. PATENT DOCUMENTS

| | | | | |
|---|---|---|---|---|
| 5,848,184 | A | 12/1998 | Taylor | |
| 5,898,795 | A | 4/1999 | Bessho | |
| 7,620,976 | B2 | 11/2009 | Low | |
| 7,689,431 | B1 | 3/2010 | Carmel | |
| 7,720,318 | B1 | 5/2010 | Phinney | |
| 7,725,423 | B1 | 5/2010 | Pricer | |
| 8,254,681 | B1 | 8/2012 | Poncin | |
| 8,881,307 | B2 | 11/2014 | Nun | |
| 9,275,030 | B1 | 3/2016 | Fang | |
| 9,607,058 | B1 | 3/2017 | Gupta | |
| 10,242,212 | B2 | 3/2019 | Tegegne | |
| 10,614,345 | B1 * | 4/2020 | Tecuci | G06V 10/22 |
| 10,642,832 | B1 | 5/2020 | Neumann | |
| 10,679,089 | B2 | 6/2020 | Annis | |
| 11,315,353 | B1 | 4/2022 | Cahn | |
| 11,947,604 | B2 | 4/2024 | Roitman | |
| 11,995,394 | B1 | 5/2024 | Morariu | |
| 12,182,125 | B1 | 12/2024 | Buniatyan | |

(Continued)

FOREIGN PATENT DOCUMENTS

| | | | |
|---|---|---|---|
| CN | 117951274 | A | 4/2024 |
| CN | 118332072 | A | 7/2024 |

(Continued)

OTHER PUBLICATIONS

Liu, Yilun, et al., "What Do You Want? User-Centric Prompt Generation for Text-to-image Synthesis via Multi-turn Guidance", arXiv, Cornell University repository, document No. arXiv:2408.12910v1 [cs.AI], Aug. 23, 2024, downloaded from: https://arxiv.org/abs/2408.12910v1, pp. 1-15.*

(Continued)

*Primary Examiner* — Robert Stevens
(74) *Attorney, Agent, or Firm* — Esplin & Associates, PC

(57) ABSTRACT

Systems and methods for generating prompts for a machine learning model based on user-selected source document information are disclosed. Exemplary implementations may: present a user interface, wherein the user interface depicts content from source documents and obtains user input to select items of user-selected information from the content; generate a prompt based on the selected items; present the generated prompt to the user; and/or perform other steps.

20 Claims, 5 Drawing Sheets

(56) References Cited

U.S. PATENT DOCUMENTS

| | | | | |
|---|---|---|---|---|
| 12,405,985 | B1 * | 9/2025 | Kanagovi | G06F 16/335 |
| 12,505,283 | B2 * | 12/2025 | Plotkin | G06F 40/166 |
| 2002/0064316 | A1 | 5/2002 | Takaoka | |
| 2004/0181749 | A1 | 9/2004 | Chellapilla | |
| 2004/0223648 | A1 | 11/2004 | Hoene | |
| 2005/0289182 | A1 | 12/2005 | Pandian | |
| 2008/0148144 | A1 | 6/2008 | Tatsumi | |
| 2008/0212901 | A1 | 9/2008 | Castiglia | |
| 2008/0291486 | A1 | 11/2008 | Isles | |
| 2009/0076935 | A1 | 3/2009 | Knowles | |
| 2009/0132590 | A1 | 5/2009 | Huang | |
| 2012/0072859 | A1 | 3/2012 | Wang | |
| 2012/0204103 | A1 | 8/2012 | Stevens | |
| 2014/0200880 | A1 | 7/2014 | Neustel | |
| 2014/0214732 | A1 | 7/2014 | Carmeli | |
| 2015/0012422 | A1 | 1/2015 | Ceribelli | |
| 2015/0169951 | A1 | 6/2015 | Khintsitskiy | |
| 2015/0169995 | A1 | 6/2015 | Panferov | |
| 2015/0278197 | A1 | 10/2015 | Bogdanova | |
| 2015/0317486 | A1 | 11/2015 | Muller | |
| 2016/0014299 | A1 | 1/2016 | Saka | |
| 2016/0275526 | A1 | 9/2016 | Becanovic | |
| 2018/0329890 | A1 | 11/2018 | Ito | |
| 2019/0138660 | A1 | 5/2019 | White | |
| 2019/0171634 | A1 | 6/2019 | Nowakiewicz | |
| 2019/0286900 | A1 | 9/2019 | Pepe, Jr. | |
| 2019/0340949 | A1 | 11/2019 | Meisner | |
| 2020/0004749 | A1 | 1/2020 | Slezak | |
| 2020/0089946 | A1 | 3/2020 | Mallick | |
| 2020/0104359 | A1 | 4/2020 | Patel | |
| 2020/0159848 | A1 | 5/2020 | Yeo | |
| 2020/0311349 | A1 | 10/2020 | Balasubramanian | |
| 2020/0320072 | A1 | 10/2020 | Hormati | |
| 2020/0364343 | A1 | 11/2020 | Atighetchi | |
| 2020/0379673 | A1 | 12/2020 | Le Gallo-Bourdeau | |
| 2021/0034621 | A1 | 2/2021 | Patel | |
| 2021/0258448 | A1 | 8/2021 | Yuusuke | |
| 2022/0164346 | A1 | 5/2022 | Mitra | |
| 2022/0414075 | A1 | 12/2022 | Li | |
| 2022/0414430 | A1 | 12/2022 | Li | |
| 2022/0414492 | A1 | 12/2022 | Jezewski | |
| 2023/0044564 | A1 | 2/2023 | Jezewski | |
| 2023/0205824 | A1 * | 6/2023 | Jablokov | G06F 16/93 707/737 |
| 2023/0315731 | A1 | 10/2023 | Liqi | |
| 2023/0385261 | A1 | 11/2023 | Siddiqui | |
| 2024/0096125 | A1 | 3/2024 | Yebes Torres | |
| 2024/0126997 | A1 | 4/2024 | Bent, III | |
| 2024/0202539 | A1 | 6/2024 | Poirier | |
| 2024/0256965 | A1 | 8/2024 | Chung | |
| 2024/0289559 | A1 * | 8/2024 | Gajek | G06F 40/40 |
| 2024/0296279 | A1 * | 9/2024 | Gardner | G06F 16/338 |
| 2024/0311407 | A1 | 9/2024 | Barron | |
| 2024/0330589 | A1 | 10/2024 | Kotaru | |
| 2024/0338361 | A1 | 10/2024 | Hazel | |
| 2024/0354436 | A1 * | 10/2024 | Mukherjee | G06F 16/3344 |
| 2025/0005523 | A1 * | 1/2025 | Katta | G06F 16/2455 |
| 2025/0045314 | A1 | 2/2025 | Madnani | |
| 2025/0045445 | A1 | 2/2025 | Srinivasan | |
| 2025/0077527 | A1 | 3/2025 | Vaughn | |
| 2025/0086190 | A1 | 3/2025 | Azarmi | |
| 2025/0086216 | A1 | 3/2025 | Murthy | |
| 2025/0111167 | A1 | 4/2025 | Mcintyre | |
| 2025/0111237 | A1 | 4/2025 | Krishnamurthy | |
| 2025/0117605 | A1 | 4/2025 | Adrian | |
| 2025/0148020 | A1 * | 5/2025 | Padmashali | G06F 16/93 |
| 2025/0165714 | A1 | 5/2025 | Krabach | |
| 2025/0272507 | A1 * | 8/2025 | Dar | G06F 40/40 |
| 2025/0284721 | A1 * | 9/2025 | Agrawal | G06F 16/3329 |
| 2025/0348741 | A1 * | 11/2025 | Rimchala | G06N 3/09 |
| 2025/0384206 | A1 * | 12/2025 | Baird | G06F 40/186 |

FOREIGN PATENT DOCUMENTS

| | | | |
|---|---|---|---|
| CN | 118656482 | A | 9/2024 |
| CN | 118939782 | A | 11/2024 |

OTHER PUBLICATIONS

Zmigrod, Ran, et al., ""What is the value of {templates}?" Rethinking Document Information Extraction Datasets for LLMs", arXiv, Cornell University repository, document No. arXiv:2410.15484v1 [cs.CL], Oct. 20, 2024, downloaded from: https://arxiv.org/abs/2410.15484, pp. 1-24.*

Song, Yunpeng, et al., "VisionTasker: Mobile Task Automation Using Vision Based UI Understanding and LLM Task Planning", UIST '24, Pittsburgh, PA, Oct. 13-16, 2024, 17 pages.*

Neumann, Mark, et al., "PAWLS: PDF Annotation With Labels and Structure", arXiv, Cornell University repository, document No. arXiv:2101.10281v1 [cs.CL], Jan. 25, 2021, downloaded from: https://arxiv.org/abs/2408.12910v1, pp. 1-6.*

Cheng, Kanzhi, et al., "SeeClick: Harnessing GUI Grounding for Advanced Visual GUI Agents", Proc. of the 62nd Annual Meeting of the Association for Computational Linguistics, vol. I: Long Papers, Aug. 11-16, 2024, pp. 9313-9332.*

Almohaimeed, Saleh, et al., "GAT-SQL: An Advanced Prompt Engineering Approach for Effective Text-to-SQL Interactions", 2024IEEE Congress on Evolutionary Computation (CEC), Yokohama, Japan, Jun. 30, 2024-Jul. 5, 2024, 10 pages.*

Ng, Youyang, et al., "SimplyRetrieve: A Private and Lightweight Retrieval-Centric Generative AI Tool", arXiv, Cornell Document Archive No. arXiv:2308.03983v1 [cs.CL], Aug. 8, 2023, 12 pages.*

Chaudhuri et al., "Extraction of type style-based meta-information from imaged documents", IJDAR (2001) 3: 138-149. (Year: 2001).

Doermann et al., "Image Based Typographic Analysis of Documents", Proceedings of 2nd International Conference on Document Analysis and Recognition, 6 pages 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Copies of Documents Based on OCR", 2019 XXI International Conference Complex Systems: Control and Modeling Problems (CSCMP), 7 pages, published on Sep. 1, 2019. (Year: 2019).

Li, M., Zhao, Y., Yu, B., Song, F., Li, H., Yu, H., & Li, Y. (2023). Api-bank: A comprehensive benchmark for tool-augmented llms. arXiv preprint arXiv:2304.08244. (15 pages) (Year: 2023).

Paranjape, B., Lundberg, S., Singh, S., Hajishirzi, H., Zettlemoyer, L., & Ribeiro, M. T. (2023). Art: Automatic multi-step reasoning and tool-use for large language models. arXiv preprint arXiv:2303.09014. (26 pgs) (Year: 2023).

Qiao, S., Gui, H., Lv, C., Jia, Q., Chen, H., & Zhang, N. (2023). Making language models better tool learners with execution feedback. arXiv preprint arXiv:2305.13068. (10 pgs) (Year: 2023).

Schick, T., Dwivedi-Yu, J., Dessi, R., Raileanu, R., Lomeli, M., Hambro, E., & Scialom, T. (2023). Toolformer: Language models can teach themselves to use tools. Advances in Neural Information Processing Systems, 36, 68539-68551. (17 pgs) (Year: 2023).

Koubaa (GPT-4 vs. GPT-3.5: A Concise Showdown, Mar. 24, 2023), 12 pages.

* cited by examiner

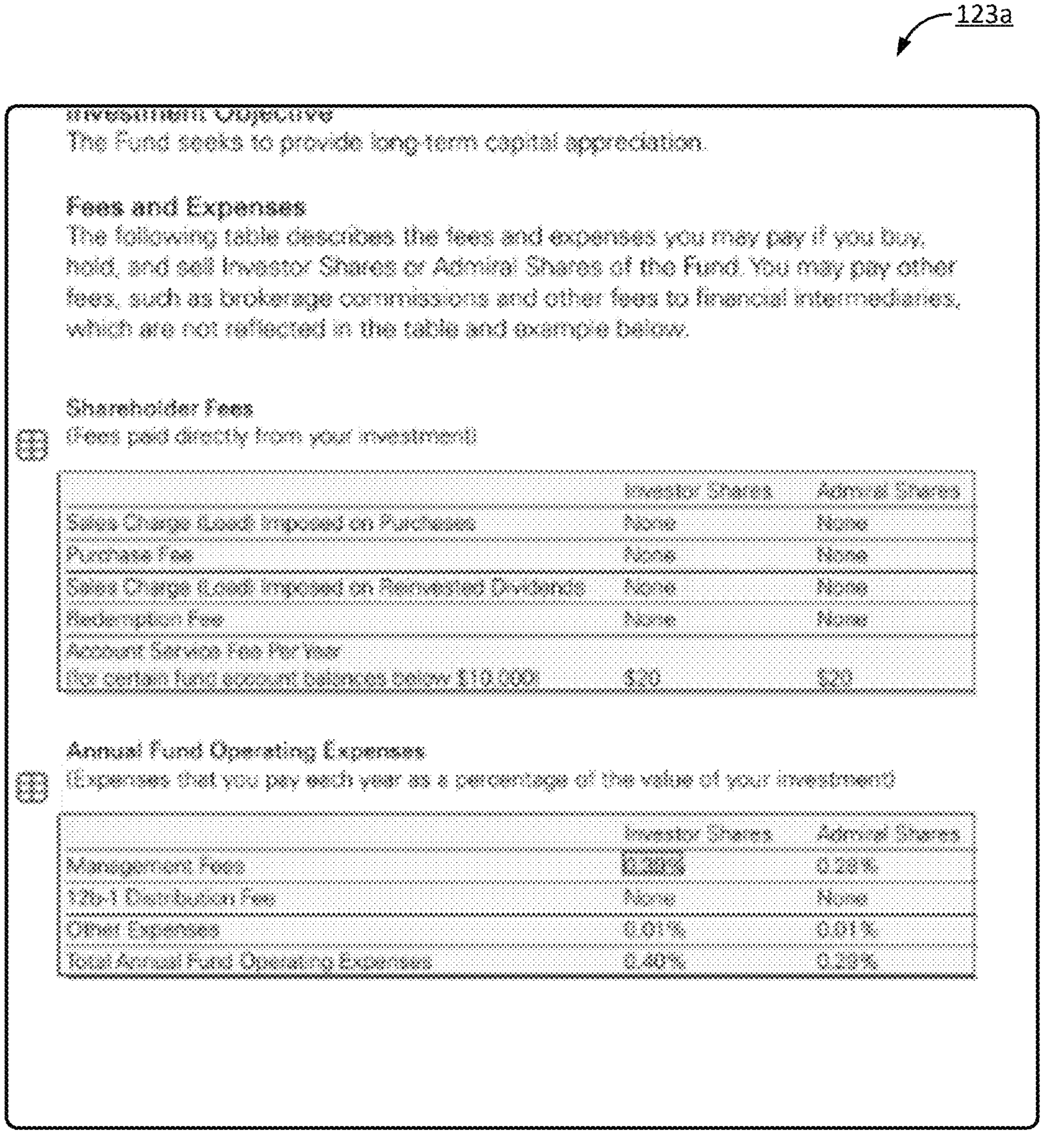

Investment Objective
The Fund seeks to provide long-term capital appreciation.

Fees and Expenses
The following table describes the fees and expenses you may pay if you buy, hold, and sell Investor Shares or Admiral Shares of the Fund. You may pay other fees, such as brokerage commissions and other fees to financial intermediaries, which are not reflected in the table and example below.

Shareholder Fees
(Fees paid directly from your investment)

| | Investor Shares | Admiral Shares |
|---|---|---|
| Sales Charge (Load) Imposed on Purchases | None | None |
| Purchase Fee | None | None |
| Sales Charge (Load) Imposed on Reinvested Dividends | None | None |
| Redemption Fee | None | None |
| Account Service Fee Per Year (for certain fund account balances below $10,000) | $20 | $20 |

Annual Fund Operating Expenses
(Expenses that you pay each year as a percentage of the value of your investment)

| | Investor Shares | Admiral Shares |
|---|---|---|
| Management Fees | 0.39% | 0.28% |
| 12b-1 Distribution Fee | None | None |
| Other Expenses | 0.01% | 0.01% |
| Total Annual Fund Operating Expenses | 0.40% | 0.29% |

*Fig. 4*

SYSTEMS AND METHODS FOR GENERATING PROMPTS FOR MACHINE LEARNING MODELS BASED ON USER-SELECTED SOURCE DOCUMENT INFORMATION

FIELD OF THE DISCLOSURE

The present disclosure relates to systems and methods for generating prompts for a machine learning model based on user-selected source document information.

BACKGROUND

Extracting information from electronic documents is known. Presenting information in user interfaces is known. Machine learning models, including large language models, are known. Writing effective prompts for a machine learning model is known to be difficult and error-prone for users.

SUMMARY

One aspect of the present disclosure relates to a system configured for generating prompts for a machine learning model based on user-selected source document information. The system may include one or more hardware processors configured by machine-readable instructions. The system may be configured to present a user interface, wherein the user interface depicts content from source documents and obtains user input to select items of user-selected information from the content. The system may be configured to generate a prompt based on the selected items. The system may be configured to present the generated prompt to the user, and/or perform other steps.

Another aspect of the present disclosure relates to a method of generating prompts for a machine learning model based on user-selected source document information. The method may include presenting a user interface, wherein the user interface depicts content from source documents and obtains user input to select items of user-selected information from the content. The method may include generating a prompt based on the selected items. The method may include presenting the generated prompt to the user, and/or performing other steps.

As used herein, any association (or relation, or reflection, or indication, or correspondency) involving servers, processors, client computing platforms, documents, characters, conversations, presentations, extracted information, user interfaces, user interface elements, portions, prompts; replies, models, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates an exemplary source document as may be used in a system configured for generating prompts for a machine learning model based on user-selected source document information, in accordance with one or more implementations.

DETAILED DESCRIPTION

Figure 1:
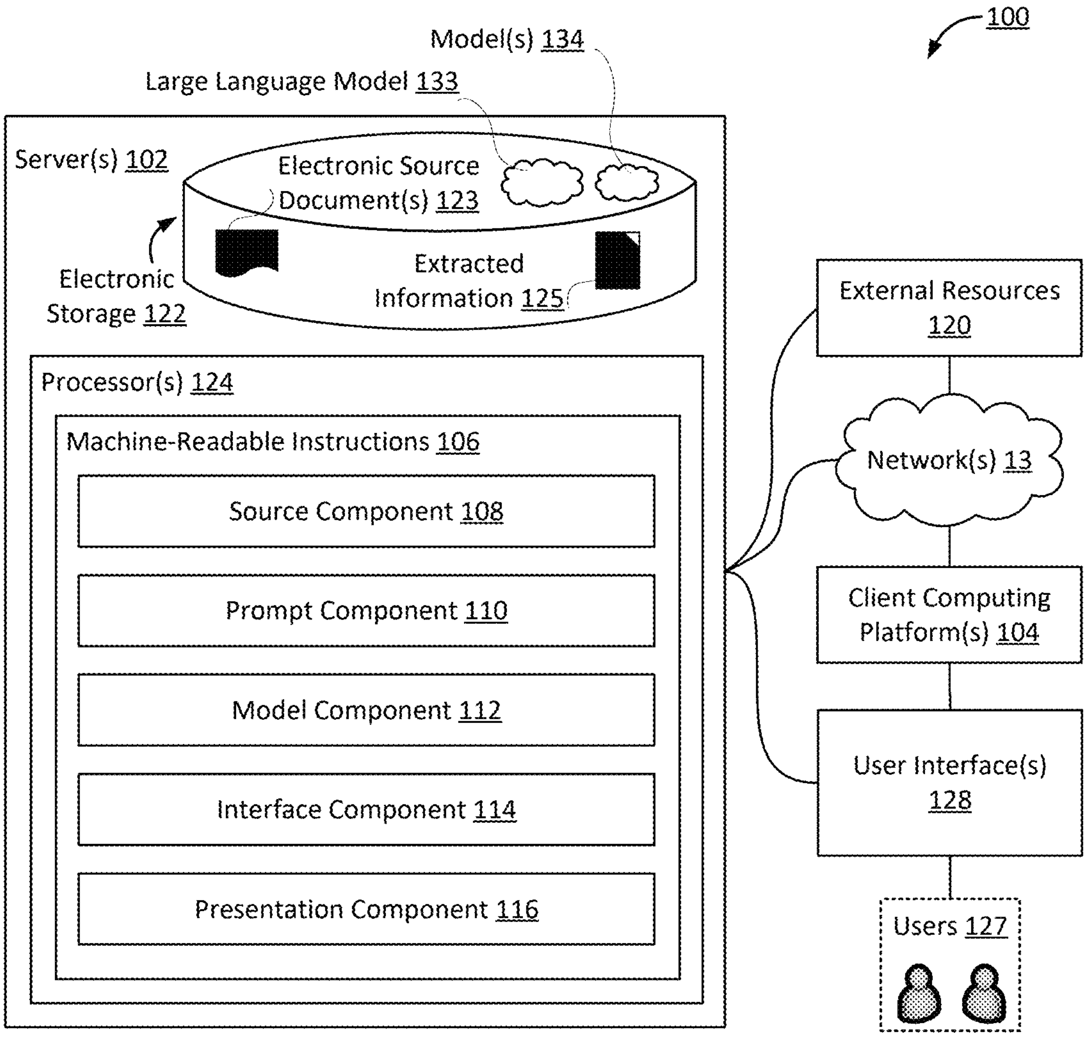
FIG. 1 illustrates a system configured for generating prompts for a machine learning model based on user-selected source document information, in accordance with one or more implementations.

FIG. 1 illustrates a system 100 configured for generating prompts for a machine learning model based on user-selected source document information, in accordance with one or more implementations. In some implementations, system 100 may include one or more servers 102, one or more client computing platforms 104, one or more user interfaces 128, external resources 120, one or more machine learning models 134, a large language model (LLM) 133, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a source component 108, a prompt component 110, a model component 112, an interface component 114, a presentation component 116, and/or other instruction components.

Source component 108 may be configured to obtain and/or retrieve documents, including but not limited to electronic source documents, including scanned images, captured photographs, and/or other documents in electronic format. As used herein, the terms "electronic document" and "electronic source document", and derivatives thereof, may be used interchangeably. One or more documents may form a corpus of electronic documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information. In some implementations, one or more electronic formats used for the electronic documents may encode visual information that represents human-readable information.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. The electronic documents obtained by source component 108 may have a particular size and/or resolution.

By way of non-limiting example, FIG. 4 illustrates a portion of an exemplary source document **123*a* as may be used in system 100 (of FIG. 1), in accordance with one or more implementations. Exemplary source document 123*a* may be part of a corpus of electronic documents. Exemplary source document 123*a* may represent a financial report from a particular corporation, and may be intended for the public. Exemplary source document 123*a*** includes many content blocks representing human-readable information, including headers, paragraphs, tables, and/or other information.

Figure 5:
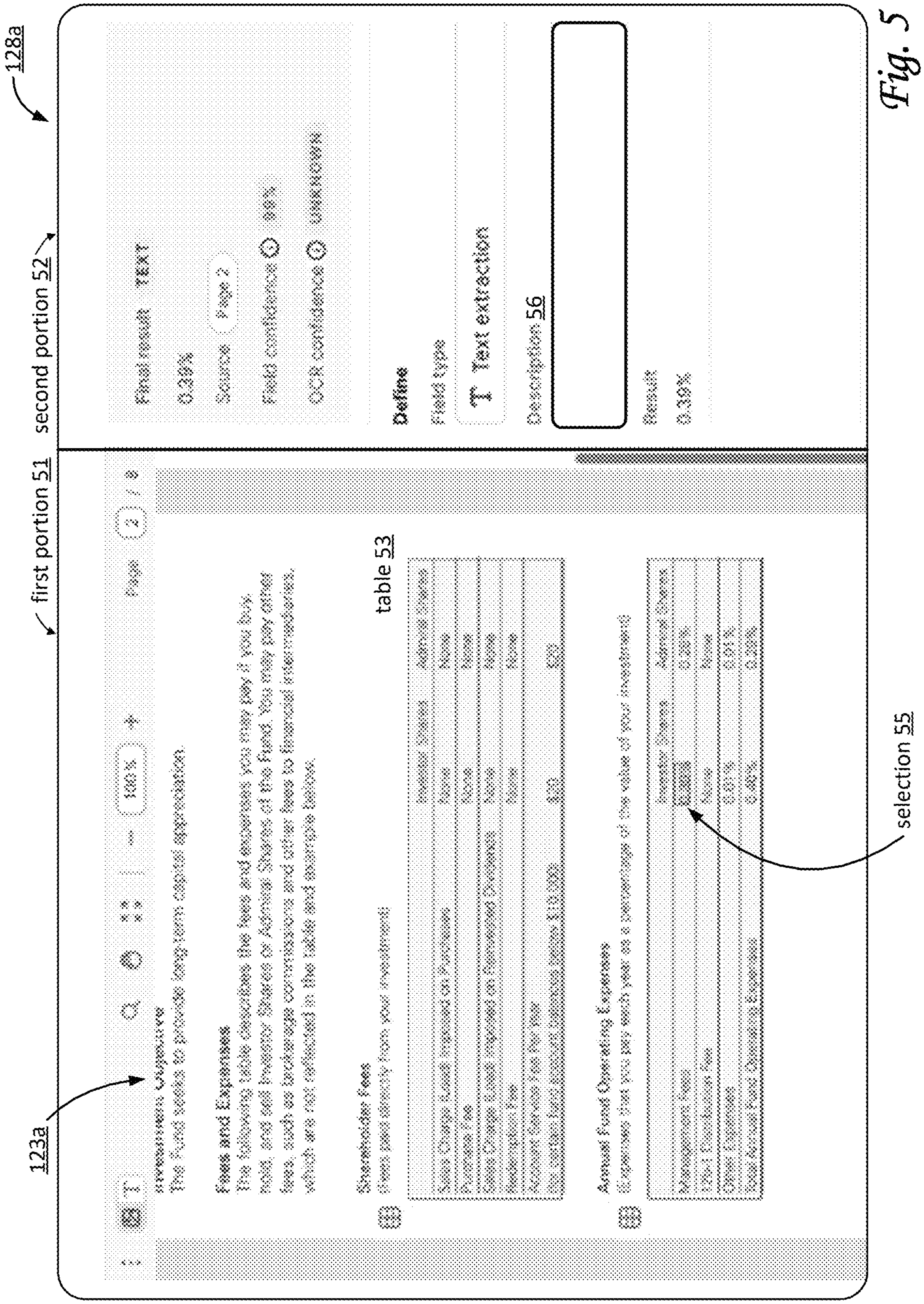
FIG. 5 illustrates an exemplary user interface as may be used in a system configured for generating prompts for a machine learning model based on user-selected source document information, in accordance with one or more implementations.

Referring to FIG. 1, presentation component 116 may be configured to generate and/or present user interfaces 128 on client computing platforms 104 to users 127. In some implementations, presentation component 116 may be configured to effectuate presentations of user interfaces 128 on client computing platforms 104 to users 127. For example, presentation component 116 may be configured to effectuate a presentation of a particular user interface 128 on a particular client computing platform 104 to a particular user. In some implementations, particular user interface 128 may be configured to depict content from one or more source documents 123, e.g., as depicted in FIG. 5, in a first portion 51 of user interface **128*a*. Referring to FIG. 1, in some implementations, particular user interface 128 may be configured to navigate among content from one or more source documents 123, e.g., in a particular portion of particular user interface 128. For example, a user of particular user interface 128 may navigate between different source documents 123, and/or within a particular (multi-page) source document 123**.

In some implementations, particular user interface 128 may be configured to obtain entry of user input from a particular user. For example, the user input may select one or more documents. For example, the user input may select one or more items or information within one or more documents. An item of information selected by a user may be referred to as a user-selected item of information, or an item of user-selected information. Part or all of the one or more documents may be provided as input and/or context to one or more machine learning models 134, e.g., to large language model 133. Multiple documents may form a corpus of electronic documents. In some implementations, the user input may enter queries, from the particular user, regarding some or all of the one or more documents, e.g., as previously selected. Particular user interface 128 may include one or more portions or sections. In some implementations, a portion or section may be a (sub) window, a tab, a frame, and/or another part of particular user interface 128. In some implementations, particular user interface 128 may include at least four portions. In other implementations, particular user interface 128 may include at least three portions. In yet other implementations, particular user interface 128 may include at least two portions. In yet other implementations, particular user interface 128 may include at least one portion.

By way of non-limiting example, FIG. 5 illustrates an exemplary user interface 128*a* as may be used by system 100. As depicted, exemplary user interface 128*a* includes a first portion 51 and a second portion 52. In this example, some or all of these portions are presented to the user at the same time. In some implementations, first portion 51 may be configured to obtain user input, by a particular user, to select information in the depicted content (here, of source document 123*a*, similar to FIG. 4). As depicted in FIG. 5, part of a document (e.g., a word, a phrase, a sentence, a caption, a number, etc.) may be emphasized to indicate a selection 55 made by the user, in this case of the text "0.39%" in a table, which is an item of user-selected information.

Referring to FIG. 1, prompt component 110 may be configured to generate prompts and/or descriptions, e.g., for one or more machine learning models 134, large language model (LLM) 133, and/or other models. Prompt component 110 may generate a particular prompt and/or description responsive to selection (by a particular user) of one or more items of user-selected information, e.g., from content as depicted and/or otherwise presented to the particular user. In some implementations, one or more machine learning models 134 and/or large language model (LLM) 133 may be instructed to generate one or more prompts that may or will return, as reply, the selected one or more items of user-selected information. Generated prompts may depend and/or otherwise be based on context around or near one or more items of user-selected information. For example, the preceding and/or current paragraphs in source document 123*a* may be analyzed in generating the prompt. For example, for selected information from a table, the table's row information and header information in source document 123*a* may be analyzed in generating the prompt.

Referring to FIG. 5, in some implementations, second portion 52 may be configured to present, to the particular user, more information regarding the selection made in first portion 51. For example, a generated prompt (e.g., by prompt component 110) may be presented to a user, e.g., in a description 56 in second portion 52. In some implementations, system 100 may be configured to verify that LLM 133 replies with information matching the selection made in first portion 51 when prompted with the generated prompt. One or more source documents 123 (or portions thereof) may be provided to LLM 133 as context for the generated prompt. By way of non-limiting example, the generated prompt and/or description for selection 55 may be (similar to) "The percentage of the fund's assets paid for management fees for Investor Shares." In some implementations, large language model 133 may be configured to provide provenance-related information for its output and/or replies, to reduce and/or prevent so-called hallucinations.

Referring to FIG. 1, in some implementations, presentation component 116 may be configured to present one or more graphical user interface elements on one or more user interfaces 128, e.g., subsequent to a selection by a user. In some implementations, presentation component 116 may present particular information in a particular portion of particular user interface 128. Referring to FIG. 5, for example, presentation component 116 may present information (e.g., replies to prompts, and/or information extracted from source documents 123) in second portion 52. By way of non-limiting example, a particular generated prompt and/or description may be presented as description 56 in portion 52 in user interface 128*a*, as depicted in FIG. 5. In some cases, a user may provide a description of a particular item of selected information, and prompt component 110 may be configured to modify, optimize, and/or otherwise improve the user's description.

As used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels.

Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

Referring to FIG. 1, model component 112 may be configured to obtain, access, use, and/or fine-tune one or more machine learning models, including machine learning models 134 and/or large language model (LLM) 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights.

In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3). In some implementations, model component 112 may be configured to fine-tune large language model 133 through a set of documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table. Accordingly, information elements in a column, or a row, or a table may be contextually and/or semantically linked and/or otherwise connected such that large language model 133 may extract information from a particular document based on knowledge of the formatted information in the particular document. In some implementations, model component 112 may be configured to obtain and/or present replies to queries from large language model 133.

Referring to FIG. 1, interface component 114 may be configured to provide documents to large language model 133 as input and/or context. For example, interface component 114 may provide one or more particular documents to large language model 133 as input and/or context for prompts, queries, and/or other types of extraction of information. In some implementations, interface component 114 provides input documents to large language model 133 for extraction of information, including but not limited to user-directed extraction of information. In some implementations, interface component 114 may be configured to obtain replies to prompts from large language model 133. For example, a user may enter a query to cause large language model 133 to extract particular information from exemplary source document 123*a* in FIG. 4. In some implementations, interface component 114 may provide input and/or prompts to large language model 133 after or subsequent to fine-tuning of large language model 133 by model component 112. In some implementations, interface component 114 may be configured to interact with machine learning models 134 and/or LLM 133, e.g., through Application Programming Interface (API) calls (e.g., as provided by OPENAI™ or other publicly available Artificial Intelligence (AI) service providers).

In some implementations, system 100 may be configured to let a user select items of information from different documents. Subsequently, a generated prompt is based on multiple items of information. In particular, the prompts may be generated using any commonality between the multiple items of information. In some implementations, system 100 may be configured to use a generated prompt with a different document for context. For example, system 100 and/or a user may verify whether a particular generated prompt returns the proper information for different source documents.

In some implementations, a user may select an entire table from a particular source document 123. For example, the user input in user interface 128 may select an entire table, such as, e.g., a table 53 as depicted in FIG. 5. System 100 may be configured to pre-process all tables in source documents 123 (e.g., in particular source document 123*a*) to store one or more of a name, a description, a location, and/or other table-specific information in an individual datastore, per table. Responsive to the user selecting a particular table, system 100 may be configured to retrieve information regarding the particular table from the corresponding datastore. Subsequently, prompt component 110 may be configured to generate a (table) prompt based on the retrieved (table-specific) information. For example, such a table prompt may describe names and descriptions of table fields for LLM 133 to match against stored names and descriptions in individual datastores. In some cases, a table prompt may instruct LLM 133 to format its reply as a table, and present such a reply to the user, e.g., in second portion 52 of user interface 128*a*. In some cases, a table prompt may instruct LLM 133 to generate Structured Query Language (SQL) queries to extract information from a particular datastore and/or table (i.e., the matching datastore/table).

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., source component 108) may obtain documents. In some implementations, external resources 120 may include a provider of information, including but not limited to extracted information 125, from which system 100 and/or its components may obtain information and/or documents. In some implementations, external resources 120 may include a machine learning model, including but not limited to LLM 133, which may be used by system 100 and/or its components. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor (s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 2:
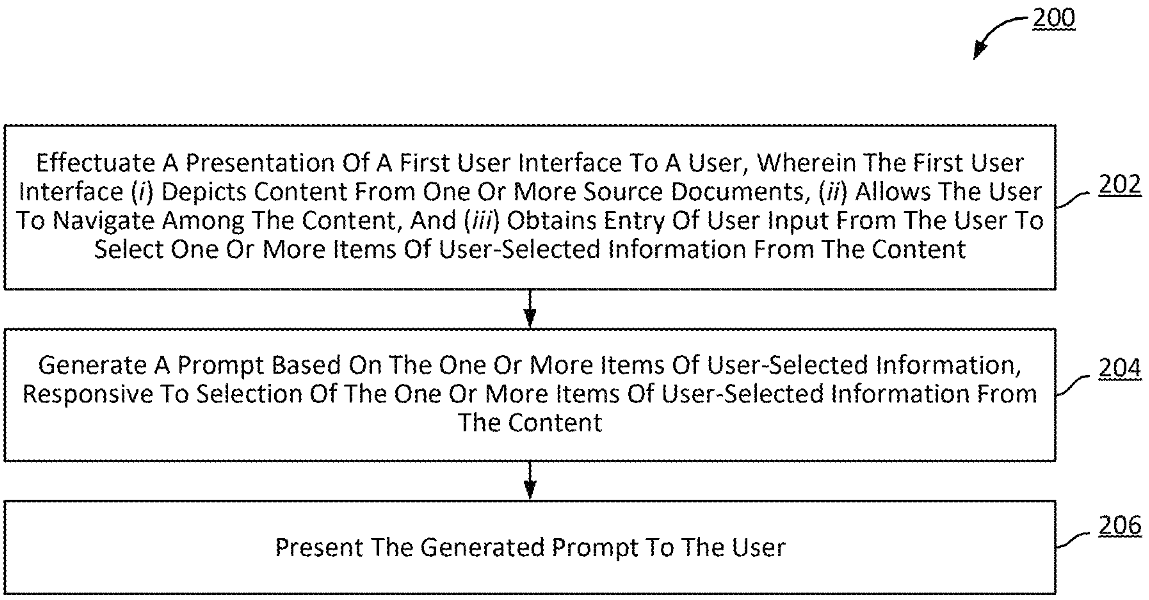
FIG. 2 illustrates a method of generating prompts for a machine learning model based on user-selected source document information, in accordance with one or more implementations.

FIG. 2 illustrates a method 200 of generating prompts for a machine learning model based on user-selected source document information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a presentation of a first user interface to a user is effectuated. The first user interface (i) depicts content from the one or more source documents, (ii) allows the user to navigate among the content, and (iii) obtains entry of user input from the user to select one or more items of user-selected information from the content as depicted. In some embodiments, operation 202 is performed by a presentation component the same as or similar to presentation component 116 (shown in FIG. 1 and described herein).

At an operation 204, a prompt is generated based on the one or more items of user-selected information, responsive to selection of the one or more items of user-selected information from the content as depicted. In some embodiments, operation 204 is performed by a prompt component the same as or similar to prompt component 110 (shown in FIG. 1 and described herein).

At an operation 206, the generated prompt is presented to the user. In some embodiments, operation 206 is performed by a presentation component 116 the same as or similar to presentation component 116 (shown in FIG. 1 and described herein).

Figure 3:
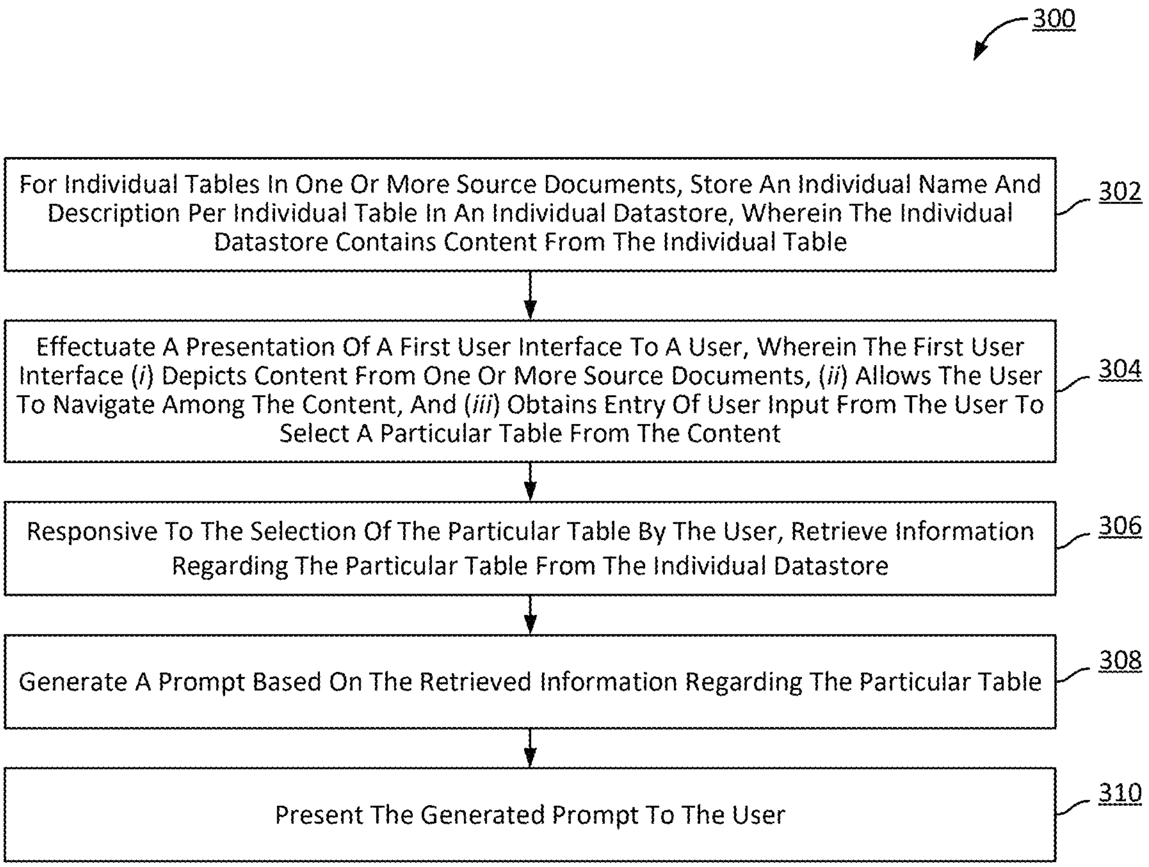
FIG. 3 illustrates a method of generating prompts for a machine learning model based on user-selected source document information, in accordance with one or more implementations.

FIG. 3 illustrates a method 300 of generating prompts for a machine learning model based on user-selected source document information, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, for individual tables in the one or more source documents, an individual name and description per individual table is stored in an individual datastore. The individual datastore contains content from the individual table. In some embodiments, operation 302 is performed by a source component the same as or similar to source component 108 (shown in FIG. 1 and described herein).

At an operation 304, a presentation of a first user interface to a user is effectuated. The first user interface (i) depicts content from the one or more source documents, (ii) allows the user to navigate among the content, and (iii) obtains entry of user input from the user to select a particular table from the content. In some embodiments, operation 304 is performed by a presentation component the same as or similar to presentation component 116 (shown in FIG. 1 and described herein).

At an operation 306, responsive to the selection of the particular table by the user, information is retrieved regarding the particular table from the individual datastore. In some embodiments, operation 306 is performed by a source component the same as or similar to source component 108 (shown in FIG. 1 and described herein).

At an operation 308, a prompt is generated based on the retrieved information regarding the particular table. In some embodiments, operation 308 is performed by a prompt component the same as or similar to prompt component 110 (shown in FIG. 1 and described herein).

At an operation 310, the generated prompt is presented to the user. In some embodiments, operation 310 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating prompts for a machine learning model based on user-selected source document information, wherein the user-selected source document information is selected from one or more source documents, the system comprising:

one or more hardware processors configured by machine-readable instructions to:

effectuate a presentation of a first user interface, the first user interface being configured to:

(i) depict content from the one or more source documents, (ii) navigate among the content, and (iii) obtain entry of user input from a user to select one or more items of user-selected information from the content as depicted;

responsive to selection of the one or more items of user-selected information from the content as depicted, provide an input to the machine learning model that indicates the one or more items of user-selected information and instructs the machine learning model to generate a prompt effective to cause retrieval of the one or more items of user-selected information from a corpus including the one or more source documents by the machine learning model;

receive the prompt from the machine learning model; and present the generated prompt to the user.

2. The system of claim 1, wherein the content from the one or more source documents is depicted in a first portion of the first user interface, wherein the entry of the user input is obtained by the user clicking and/or selecting the one or more items of user-selected information as depicted in the first portion of the first user interface, and wherein the generated prompt is presented in a second portion of the first user interface.

3. The system of claim 1, wherein the one or more hardware processors are further configured to verify that the machine learning model generates the one or more items of user-selected information in reply to being provided with the generated prompt as input.

4. The system of claim 1, wherein the one or more hardware processors are further configured to:

provide the generated prompt to the machine learning model, using the one or more source documents as context for the generated prompt;

obtain a reply from the machine learning model; and present the reply to the user.

5. The system of claim 1, wherein the user input selects a first item from a first source document, and wherein the first user interface is further configured to:

obtain a second entry of second user input from the user to select a second item from a second source document;

wherein the generated prompt is further based on the second item.

6. The system of claim 1, wherein the one or more source documents include a first source document and a second source document, wherein the user input selects a first item from the first source document, and wherein the one or more hardware processors are further configured to:

provide the generated prompt to the machine learning model, using the second source document as context for the generated prompt;

obtain a reply from the machine learning model; and present the reply to the user.

7. The system of claim 1, wherein the generated prompt instructs the machine learning model to generate Structured Query Language (SQL) queries to extract table fields from the one or more source documents.

8. The system of claim 1, wherein the input provided to the machine learning model further includes context proximate to the one or more items of user-selected information in the one or more source documents, and wherein the machine learning model generates the prompt based at least in part on the context.

9. The system of claim 1, wherein the machine learning model is a large language model hosted on an external resource, and wherein the one or more hardware processors provide the input to the large language model through an application programming interface (API).

10. The system of claim 1, wherein the first user interface is further configured to obtain text input from the user describing the one or more items of user-selected information, and wherein the input provided to the machine learning model instructs the machine learning model to enhance the text input from the user to generate the prompt.

11. A method of generating prompts for a machine learning model based on user-selected source document information, wherein the user-selected source document information is selected from one or more source documents, the method comprising:

effectuating a presentation of a first user interface to a user, wherein the first user interface (i) depicts content from the one or more source documents, (ii) allows the user to navigate among the content, and (iii) obtains entry of user input from the user to select one or more items of user-selected information from the content as depicted;

responsive to selection of the one or more items of user-selected information from the content depicted, providing an input to the machine learning model that indicates the one or more items of user-selected information and instructs the machine learning model to generate a prompt effective to cause retrieval of the one or more items of user-selected information from a corpus including the one or more source documents by the machine learning model;

receiving the prompt from the machine learning model; and presenting the generated prompt to the user.

12. The method of claim 11, wherein the content from the one or more source documents is depicted in a first portion of the first user interface, wherein the entry of the user input is obtained by the user clicking and/or selecting the one or more items of user-selected information as depicted in the first portion of the first user interface, and wherein the generated prompt is presented in a second portion of the first user interface.

13. The method of claim 11, further comprising:

verifying that the machine learning model generates the one or more items of user-selected information in reply to being provided with the generated prompt as input.

14. The method of claim 11, further comprising:

providing the generated prompt to the machine learning model, using the one or more source documents as context for the generated prompt;

obtaining a reply from the machine learning model; and presenting the reply to the user.

15. The method of claim 11, wherein the user input selects a first item from a first source document, and wherein the first user interface further:

obtains a second entry of second user input from the user to select a second item from a second source document;

wherein the generated prompt is further based on the second item.

16. The method of claim 11, wherein the one or more source documents include a first source document and a second source document, wherein the user input selects a first item from the first source document, the method further comprising:

providing the generated prompt to the machine learning model, using the second source document as context for the generated prompt;

obtaining a reply from the machine learning model; and presenting the reply to the user.

17. The method of claim 11, wherein the first user interface further obtains text input from the user, wherein the text input describes the one or more items of user-selected information, and wherein the generated prompt is further based on the text input.

18. The method of claim 11, wherein the input provided to the machine learning model further includes context proximate to the one or more items of user-selected information in the one or more source documents, and wherein the machine learning model generates the prompt based at least in part on the context.

19. The method of claim 11, wherein the machine learning model is a large language model hosted on an external resource, and wherein providing the input to the machine learning model comprises transmitting the input to the large language model through an application programming interface (API).

20. The method of claim 11, further comprising obtaining, via the first user interface, text input from the user describing the one or more items of user-selected information, wherein the input provided to the machine learning model instructs the machine learning model to enhance the text input from the user to generate the prompt.

* * * * *